US010468730B2

(12) United States Patent
Rodriguez et al.

(10) Patent No.: US 10,468,730 B2
(45) Date of Patent: Nov. 5, 2019

(54) BATTERY RELIABILITY ODOMETER

(71) Applicant: Intel Corporation, Santa Clara, CA (US)

(72) Inventors: Jorge P. Rodriguez, Portland, OR (US); Alexander B. Uan-Zo-Li, Hillsboro, OR (US); Naoki Matsumura, San Jose, CA (US); Andrew Keates, Los Gatos, CA (US); James G. Hermerding, II, Vancouver, WA (US)

(73) Assignee: INTEL CORPORATION, Santa Clara, CA (US)

( * ) Notice: Subject to any disclaimer, the term of this patent is extended or adjusted under 35 U.S.C. 154(b) by 328 days.

(21) Appl. No.: 14/866,870

(22) Filed: Sep. 26, 2015

(65) Prior Publication Data
US 2017/0092996 A1     Mar. 30, 2017

(51) Int. Cl.
*H01M 10/48* (2006.01)
*H02J 7/00* (2006.01)
(Continued)

(52) U.S. Cl.
CPC ........... *H01M 10/48* (2013.01); *H02J 7/0021* (2013.01); *H02J 7/0047* (2013.01); *H02J 7/0091* (2013.01);
(Continued)

(58) Field of Classification Search
CPC .... G06F 1/00; G06F 1/32; G06F 1/26; H01M 10/48; H01M 2010/4278; G05B 15/02;
(Continued)

(56) References Cited

U.S. PATENT DOCUMENTS 6,470,290 B1 * 10/2002 Lee ................. G06F 1/3203
                                                         324/425
8,966,305 B2 *  2/2015 Branover ........... G06F 1/3203
                                                         713/320
(Continued)

OTHER PUBLICATIONS

International Search Report and Written Opinion received for PCT Patent Application No. PCT/US2016/053841, dated Jan. 11, 2017, 10 pages.

*Primary Examiner* — Brian W Wathen
*Assistant Examiner* — Mohammed Shafayet

(57) ABSTRACT

Various embodiments may be generally directed to techniques for using an observed battery stress history to manage operation of a computing system component in a high power performance mode when powered by a battery. Various embodiments include techniques for tracking stresses to a battery. Various embodiments include techniques for comparing the battery stress history to a degradation baseline for the battery. Various embodiments include techniques for developing a degradation baseline for a battery including, for example, a degradation baseline based on expected stress to a battery and/or a degradation baseline based on a battery reliability model. Various embodiments include techniques for determining a battery stress surplus or deficit. Various embodiments include techniques for managing operation of a performance enhancing mode or high power performance mode of a computing system component based on the determined battery stress surplus or deficit.

23 Claims, 11 Drawing Sheets

(51) Int. Cl.
*H02J 7/04* (2006.01)
*H01M 10/42* (2006.01)

(52) U.S. Cl.
CPC ..... *H02J 7/047* (2013.01); *H01M 2010/4278* (2013.01)

(58) Field of Classification Search
CPC .. H02J 1/14; H02J 7/047; H02J 7/0091; H02J 7/0021; H02J 7/0047
USPC .................................................. 713/322, 323
See application file for complete search history.

(56) References Cited

U.S. PATENT DOCUMENTS

| | | | | |
|---|---|---|---|---|
| 2001/0001532 A1* | 5/2001 | Galbraith | ........... | G01R 31/3679 320/132 |
| 2003/0188210 A1* | 10/2003 | Nakazato | .............. | G06F 1/3203 713/320 |
| 2006/0143483 A1* | 6/2006 | Liebenow | ............. | G06F 1/3203 713/300 |
| 2006/0288243 A1 | 12/2006 | Kim | | |
| 2008/0005599 A1* | 1/2008 | Theocharous | ........ | G06F 1/3203 713/300 |
| 2008/0168287 A1* | 7/2008 | Berry | ...................... | G06F 1/266 713/323 |
| 2010/0000809 A1* | 1/2010 | Nishi | ..................... | B60K 6/445 180/65.29 |
| 2010/0036628 A1* | 2/2010 | Plestid | ............... | G01R 31/3679 702/63 |
| 2010/0185885 A1 | 7/2010 | Oh et al. | | |
| 2010/0229012 A1* | 9/2010 | Gaskins | ................ | G06F 1/3203 713/322 |
| 2012/0072752 A1* | 3/2012 | Kennedy | ............... | G06F 1/3206 713/323 |
| 2013/0158915 A1* | 6/2013 | Humla | ................. | G01R 31/387 702/63 |
| 2013/0193928 A1* | 8/2013 | Prosser | ................. | H02J 7/0042 320/130 |
| 2013/0198541 A1* | 8/2013 | Rabii | ........................ | G06F 1/26 713/320 |
| 2013/0246820 A1* | 9/2013 | Branover | ............. | G06F 1/3296 713/320 |
| 2013/0264999 A1* | 10/2013 | Srinivasan | ........... | H02J 7/0052 320/107 |
| 2014/0028267 A1* | 1/2014 | Lee | ....................... | H02J 7/0052 320/152 |
| 2014/0217958 A1* | 8/2014 | Verdun | ................. | H02J 7/0057 320/107 |
| 2014/0222359 A1* | 8/2014 | Ko | ....................... | H01M 10/425 702/63 |
| 2015/0006971 A1* | 1/2015 | Shapira | ............... | G06F 11/3024 714/47.1 |
| 2015/0092103 A1* | 4/2015 | Lundgren | .......... | H04N 5/23241 348/371 |
| 2015/0160302 A1* | 6/2015 | Xu | ........................ | H01M 10/42 324/427 |
| 2015/0181117 A1* | 6/2015 | Park | ................... | H04N 5/23216 348/372 |
| 2016/0185238 A1* | 6/2016 | Morikawa | ............. | B60L 3/0046 320/134 |
| 2016/0185248 A1* | 6/2016 | Aoshima | ................ | B60L 3/00 701/22 |

* cited by examiner

Storage Medium 900

Computer Executable Instructions for 600

Computer Executable Instructions for 800

Computer Executable Instructions for 1100

BATTERY RELIABILITY ODOMETER

TECHNICAL FIELD

Embodiments herein generally relate to management of battery power sources and battery operated devices.

BACKGROUND

Many computing systems include components capable of operating in higher power performance modes. For example, certain computing systems include processors capable of a higher power performance mode that is often referred to as turbo boosting or dynamic overclocking. These higher power performance modes, including, for example, turbo boosting, can enhance performance but typically require an increased amount of power over some baseline power requirement. Many conventional computing systems, when operating under battery power, prevent or severely restrict the performance enhancing operations such that the battery experiences minimal degradation. As a result, these conventional battery management and performance management systems fail to realize the benefits of components such as processors capable of operating in performance enhancing modes. In other words, conventional battery management systems may be fixed and inflexible, thereby unnecessarily curtailing component performance without regard to the actual stress experienced by the battery.

BRIEF DESCRIPTION OF THE DRAWINGS

FIG. 9 illustrates an example of a storage medium.

DETAILED DESCRIPTION

Figure 1:
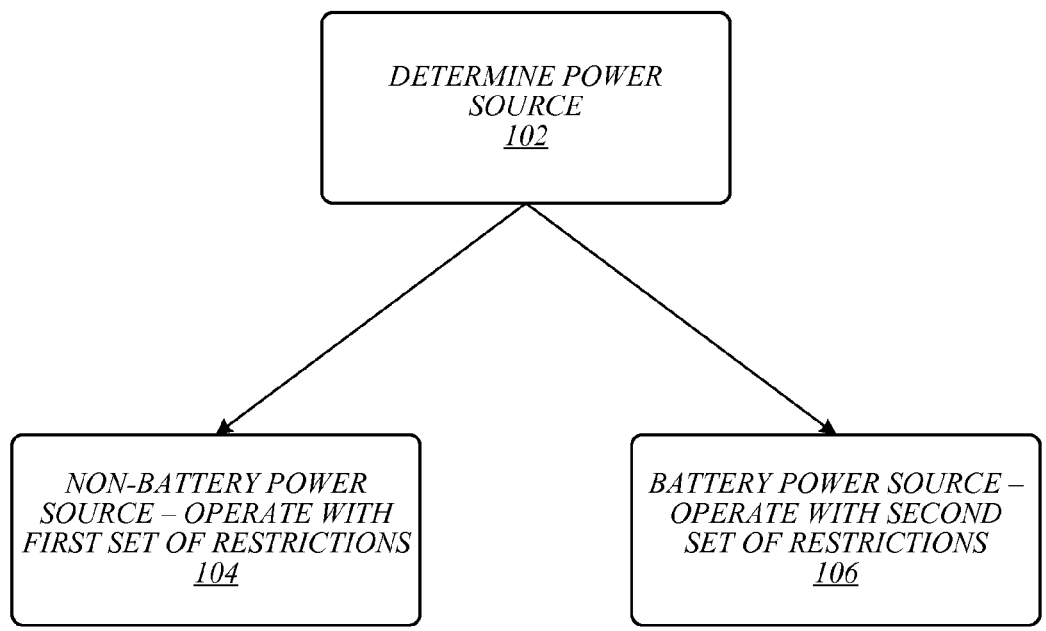
FIG. 1 illustrates a conventional technique for processor and battery management.

Reliability of a battery can refer to performance of the battery within specified performance limits, for a specified length of time (e.g., as specified by a user or customer), when used in the manner and for the purposes intended while operating under specified application and operation environment stress levels. Specified performance limits can refer to acceptable degradation to battery parameters—such as, for example, capacity retention and ability of the battery to deliver peak power. Specified application and operation environment stress levels can refer to expected future stress levels. Expected future stress levels can be different from expected stress levels experienced by a battery over its lifetime—that is, expected stress can be a measure of stress experienced to the battery to date (i.e., not forward looking) and can be based on an estimate of average stress applied to a battery so that an any time, an expected stress to a battery over its lifetime to date can be determined.

To meet an expected long term reliability or end of life capability of the battery, a system designer can assume an average battery degradation rate (e.g., a predicted degradation baseline) driven by many factors such as charge level, number or charge or discharge cycles, temperature, voltage, peak and average current draw. This average battery degradation rate can be used to generate the expected stress to the battery discussed above—i.e., it can be used to estimate how much stress has been applied to a battery over its lifetime at any current point in time. A designer may have to increase battery capacity, size, cell stack or other factors to meet the end of life reliability target due to expected lifetime average degradation.

Another option for the designer is to reduce the capability and feature set of the system to lower the stress factors that impact reliability (e.g., that may accelerate degradation). In various embodiments herein, techniques are provided for setting the end of life degradation goal (e.g., baseline) and then over the product lifetime monitoring stresses that cause battery degradation to be higher or lower than the predicted degradation baseline. The reliability control loop can decrease battery stress, and thus degradation rate, by reducing system performance or temperature or overall current draw or voltage when the rate of degradation is higher than the expected average rate of degradation, so as to meet battery reliability requirements as discussed above. The reliability control loop can also allow the system to periodically go beyond the average allowed stress if the observed stress history (and thus degradation of capacity or peak power capability) is trending below the system designer target. This offers additional performance that would not have been allowed without the monitoring loop. Thus, the overall average lifetime battery degradation is maintained and the battery reliability meets the lifetime requirement of the system designer.

Determining a battery degradation baseline may prove difficult in practice. This is because it may use characterization of degradation and degradation acceleration factors for different battery types, suppliers, sizes, etc. This can be a time consuming and costly process. An alternative approach, which may be more pragmatic, can include a focus on expected stress and account for stress beyond the expectation or below the expectation. For example, stress can be counted to determine a deficit or a surplus. Accordingly, higher performance (and associated stress) can be allowed based on a stress surplus while higher performance (and associated stress) can be limited based on a stress deficit.

Certain computing systems are designed to enable a processor to operate at frequencies above a base or baseline operating frequency when the workload on the processor calls for faster performance. This performance enhancing technique is often referred to as turbo boosting or dynamic overclocking. Intel® Turbo Boost is an example of such a performance enhancing technique. Intel® Turbo Boost can provide dynamic control of the processor's clock rate to meet heightened performance demands.

To operate at frequencies above a base operating frequency, the power demands of the processor are generally increased. As such, operations performed by the processor at these times are often considered to be high power events to reflect the increased power demands during times of increased performance at higher clock rates.

Computing systems can also include other components capable of operating in modes that demand higher power.

Examples include high resolution modes for a camera, flash modes for a camera, and image resolution or light intensity for a display. In general, these variable mode components can operate in multiple different modes, with higher performance modes typically demanding more power than lower performance modes.

Often, when the computing system is provided with an external power source (e.g., a non-battery AC power source), increased power demands can be met with few limitations. That is, high power events are typically not restricted, or alternatively face few restrictions, by the input power source under such circumstances. Instead, such events are generally restricted only by the processor's thermal and electrical limits when operating under an external power source.

In contrast, when the computing system is powered by a non-AC power source (e.g., an internal battery), the non-AC power source's capacity and degradation are often considered when determining the extent to which a component is allowed to operate in a higher power performance mode. For example, increased emphasis can be placed on a battery's degradation when determining how long a processor is allowed to exceed a baseline operating frequency. That is, the power demands of the processor can be taken into consideration more in terms of possible battery degradation and reduced capacity (and therefore overall life of the battery) that may result from the increased power demands.

Many conventional computing systems place significant restrictions on increasing a processor's clock rate above a baseline operating frequency in order to safeguard against excessive battery degradation. These restrictions can be imposed by the computing system, processor, and/or the user of a device containing the processor.

Many of the restrictions, however, are overly restrictive as well as artificial, leaving the benefits and capabilities of the processor and/or the computer system untapped. In turn, the performance of a battery powered device having turbo capable processors can be reduced, even to the point where increased performance that would not significantly degrade the battery is prevented. An example of such rigid restrictions includes guard bands placed on higher power performance states. As more handheld and other battery powered devices incorporate more turbo capable processors, the inefficiencies resulting from overly burdensome restrictions on the turbo features of the processors will increase. As these or similar restrictions can be placed on other variable mode components of the computing system, performance enhancing features of these components can also be overly reduced.

FIG. 1 illustrates a conventional technique 100 for managing a computing system component capable of higher power performance modes. For example, conventional technique 100 can be applicable to management of a processor capable of operating at an increased frequency at certain times. The technique 100 can represent a portion of management of a component when a high power event is underway or is imminent. At block 102, the power source of the component is determined. Specifically, it can be determined if the component is being powered by an available AC power source or a battery source. If the component is powered by an AC power source, then at block 104, the component is managed to operate under a first set of restrictions. As an example, at block 104, a processor can be allowed to operate at a higher clock rate under a first set of restrictions. If it is determined that the component is powered by a battery power source, then at block 106 a second set of restrictions are placed on the component. In general, the second set of restrictions are much more burdensome and performance limiting that the first set of restrictions. Further, as described above, these restrictions can be severe to the point where component performance is limited so that minimal battery degradation is experienced. That is, under many conventional techniques, performance can be limited without any regard to actual stress applied to the battery. As a result, component performance—and therefore user experience—can be significantly hampered.

As an example of severe restrictions (e.g., the second set of restrictions in block 106), a processor can be restricted based on an allowable duty ratio in order to minimally degrade a battery. Specifically, the processor can be limited to a high power event of no more than 10 milliseconds (ms) duration and no more than 9% duty ratio—as this restriction has been found empirically to not degrade the life of a battery significantly. While such a restriction may prevent or at least significantly reduce the risk of degrading the battery, the restriction can be so severe that performance is greatly hampered. Further, the restriction fails to allow for longer duration high power events or accommodate the frequency of high power events. As more devices become dependent on battery power and as more processors are required to handle more frequent high power events, these conventional restrictions prevent realization of the enhanced capabilities of today's processors. The same can be said for overly restricting other computing system components capable of higher power operating modes that can provide enhanced performance.

Various embodiments may be generally directed to techniques for using an observed battery stress history to manage operation of a computing system component in a higher power performance mode when powered by a battery. Various embodiments include techniques for tracking stresses to a battery—in particular, stress experienced by a battery during high powered events of a component. Various embodiments include techniques for comparing the battery stress history to a degradation baseline for the battery. Various embodiments include techniques for developing a degradation baseline for a battery including, for example, a degradation baseline based on expected stress to a battery and/or a degradation baseline based on a battery reliability model. Various embodiments include techniques for determining a battery stress surplus or deficit. Various embodiments include techniques for managing operation of a performance enhancing mode or higher power performance mode of a computing system component based on the determined battery stress surplus or deficit.

As an example, various embodiments may be generally directed to techniques for using an observed battery stress history to determine an increased level of processor performance and therefore increased level of battery stress that can be applied. Various embodiments include techniques for tracking stresses to a battery power source due to large power demands placed on the battery during performance enhancing operations of an associated processor. Various embodiments include techniques for comparing the stresses to a battery reliability model. Various embodiments include techniques that can determine a level of stress to a battery that can be tolerated and therefore a corresponding amount of improved performance for the processor. Various embodiments include techniques for regulating processor operation to ensure the stress to the battery is acceptable such that a long term target performance of the battery can be met. Various embodiments provide techniques for allowing additional degradation to the battery to boost processor performance while still maintaining long term target performance of the battery.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 2:
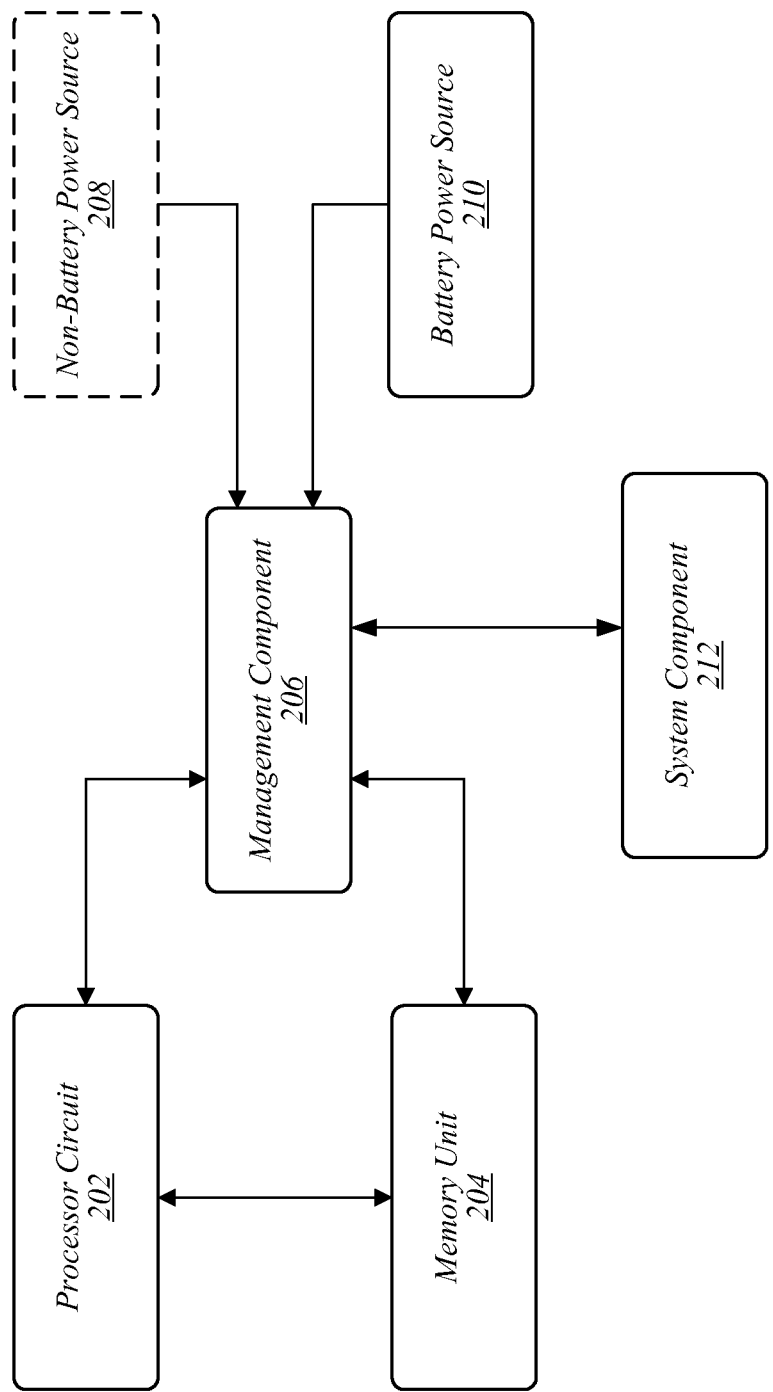
FIG. 2 illustrates a system for providing a battery reliability odometer.

FIG. 2 illustrates a system 200 for realizing or implementing a battery reliability odometer. The system 200 can use an observed or determined battery stress history to determine a permissible level of higher performance for a component—which can translate into future battery stress. Specifically, the system 200 can determine when power to the system 200 is provided by a battery, can track the level of stress experienced by a battery over time, and can determine a permissible amount of additional stress that can be placed on the battery to support a high power event (e.g., turbo boosting by a processor or increased light intensity by a display) while keeping the overall stress of the battery within a desired target range. In doing so, the system 200 enables a computing system component to operate in a higher power performance enhancing mode for longer periods of time and/or more frequently. For example, the system 200 can enable a processor to operate in a turbo boosting mode when powered by a battery—even though certain heightened battery stress can be experienced—while still also ensuring a long term battery capacity target can be met.

As shown in FIG. 2, the system 200 can include a processor circuit 202, a memory unit 204, a management component 206, an AC power source 208, a battery power source 210, and a system component 212. The system component 212 can be a variable mode component capable of operating in various performance modes. High performance modes can typically demand more power than a baseline operating mode or lower performance mode of the system component 212. As such, the high performance mode can be considered to be a higher power performance mode to reflect its ability to provide higher performance but with generally increased power demands. The AC power source 208 is shown in phantom to indicate that the AC power source 208 is not always coupled or provided to the system 200.

The system 200 can be provided as part of a computing device. For example, the system 200 can be provided as part of a desktop computer, a laptop computer, or a handheld computing device such as, for example, a smartphone, tablet or a camera. The system 200 can provide a component and/or functionality that is integrated into a larger system. As part of a larger system (e.g., a smartphone), the system 200 can be integrated into the larger system having a display, a radio frequency (RF) transceiver, and/or a user interface. The system component 212 can represent any of a variety of components of a computing system such as, for example, a monitor, a display, a camera, a RF transceiver—i.e., generally any computing system component capable of operating in a higher power performance mode that can demand more power than a baseline operating mode.

As shown in FIG. 2, the management component 206 is coupled to the processor circuit 202, the memory unit 204, the AC power source 208, the battery power source 210, and the system component 212. The processor circuit 202 is also coupled to the memory unit 204. Other connections and coupling between the constituent components of the system 200 can be provided but are not shown in FIG. 2 for simplicity.

Processor 202 can be the main processor for a device in which the system 200 is provided. Processor 202 can be a turbo capable processor—i.e., capable of operating at an increased clock rate over a baseline operating frequency. When processor 202 operates in a turbo boost mode, more power can be demanded by the processor 202 as compared to when the processor 202 operates at its baseline operating frequency. As such, operation in turbo mode can be considered as the processor 202 operating in a high power event or in a high or higher power performance mode. One or more of the clock rate, duty cycle and power (e.g., current) draw or demand of the processor 202 can be increased during such an event to realize increased performance by the processor 202.

Processor circuit 202 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 202 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 202 may be implemented as a general purpose processor, such as a processor made by Intel® Corporation, Santa Clara, Calif. The embodiments are not limited in this context.

In various embodiments, any constituent component of system 200 and/or processor circuit 202 may comprise or be arranged to communicatively couple with memory unit 204. Memory unit 204 may be implemented using any machine-readable or computer-readable media capable of storing data, including both volatile and non-volatile memory. For example, memory unit 204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 204 may be included on the same integrated circuit as processor circuit 202, or alternatively some portion or all of memory unit 204 may be disposed on an integrated circuit or other medium, for example a hard disk drive, that is external to the integrated circuit of processor circuit 202. Although memory unit 204 is comprised within or as part of system 200, memory unit 204 may be external to system 200 in some embodiments. The embodiments are not limited in this context.

The AC power source 208 can represent access to a non-battery power source for the system 200. For example, the AC power source 208 can represent a continuously available non-battery power source made available when system 200, or the larger system of which system 200 is within, is attached or coupled thereto—such as, for example, a wall outlet.

The battery power source 210 can represent a power source that is part of the larger system or device of which the system 200 is a part. The battery power source 210 can be any type of battery and can be considered to be internal to the larger system or device of which the system 200 is a part. The battery power source 210 can provide power to the system 200 when the AC power source 208 is not available. The battery power source 210 can power the system 200 in conjunction with the AC power source 208.

The management component 206 may comprise logic, circuitry, and/or instructions (e.g., instructions capable of being executed by the processor circuit 202 or another processor or system component) to monitor or track stress to the battery power source 210 and to determine when additional stress to the battery power source 210 can be applied to accommodate high power events by the system component 212 or high power events by the processor 202 (e.g., turbo operation by the processor 202).

In various embodiments, the management component 206 can monitor the power source provided to the system 200. That is, the management component 206 can determine if the system 200 is powered by the AC power source 208 or alternatively the battery power source 210. The management component 206 can also determine expected high power events—that is, a time when the processor circuit 202 could be operated in a turbo boost mode to handle an increased workload or a time when the system component 212 could be operated in a high power performance mode.

In various embodiments, the management component 206 can track the stress history of the battery power source 210. That is, the management component 206 can track stresses applied to the battery 210. The stresses can be experienced by the battery 210 during baseline operation of the system 200 and/or during high power performance modes of any component of the system 200. Examples of stresses than can be tracked by the management component 206 include, for example, battery temperature increases correlated to high energy discharge events (e.g., that occur during high power performance modes of operation of a component of the system 200), battery temperature increases correlated to fast charging/recharging events, high ambient operating temperatures, and number of battery charge/discharge cycles as well as battery voltage, current, state of charge and capacity. The management component 206 can track these events as stress events to the battery 210. The management component 206 can accumulate these experienced stress to maintain an accumulated stress history for the battery 210—i.e., a history of the amount of stress experienced by the battery 210. This stress history can be the actual amount or level of stress experienced by the battery 210 based on monitoring or observation of tracked stress events.

In various embodiments, the management component 206 can compare the stress history of the battery 210 to a battery degradation baseline. The management component 206 can generate a battery degradation baseline based on expected stress to the battery (e.g., expected stress to the battery over a lifetime of the battery) and/or a battery reliability model. The expected stress to the battery 210 can be an average stress of the battery. The average stress to the battery 210 can be based on an estimation of stress experienced by the battery 210 when operated at a normal or baseline level—e.g., correlated to an average operating temperature of the battery 210.

Additionally, the management component 206 can calculate stress to the battery 210 based on monitored battery 210 characteristics using a battery degradation model. The battery degradation model can be based on capacity or degradation models provided by the battery manufacturer, models developed by empirical information, or any other model (e.g., models based on the physical and chemical characteristics of the battery 210). The management component 206 can therefore gauge degradation to the battery 210 based on observed or monitored stress to the battery 210. The determined stress can be compared or correlated with actual degradation of the battery 210 to calibrate the stress tracking calculations to provide an accurate indication of battery 210 degradation based on stress tracking.

In various embodiments, the management component 206 can compare the stress history of the battery 210 to the degradation baseline to determine if a battery stress surplus (e.g., which may allow additional stress to be applied to the battery 210) or a battery stress deficit (e.g., which may not allow additional stress to be applied to the battery 210) exists. In various embodiments, the battery stress surplus or deficit can be determined by comparing the average expected stress to the battery 210 to the tracked stress to the battery 210 as determined by the management component 206. The stress history of the battery 210 can be an observed accumulated total stress experienced by the battery as described above. Further, the management component 206 can calculate a battery degradation based on the stresses to the battery that can be compared to the battery degradation model for the battery 210 to determine if additional battery degradation is acceptable or unacceptable, thereby determining if restrictions on a high power performance mode may be applied.

In various embodiments, depending on whether a battery stress surplus or deficit exists, the management component 206 can regulate operation of a component of the system 200. For example, if it is determined that a battery stress surplus exists, the management component 206 may determine that a turbo boosting operation of the processor 202 can be allowed to run with minimal or no restrictions. As another example, if it is determined that a battery stress deficit exists, the management component 206 may determine that a turbo boosting operation of the processor 202 cannot be allowed to run or can run with significant restrictions (e.g., significant limitations on the period of time the turbo bosting operation may last or on the amount of power than can be drawn or demanded). In various embodiments, the battery degradation baseline can be correlated or based on a desired target battery capacity at some future point in time.

Overall, the management component 206 can track the stress history of the battery 210 and to determine how much additional stress can be applied to the battery 210 based on a comparison to an expected level of stress to the battery 210. By determining if additional stress to the battery 210 can be applied, the management component 206 can determine the parameters of a high power event—in terms of its demands on the battery power source 210—so as to adjust how much stress is applied to the battery 210. In this way, high power events of a certain magnitude (e.g., in terms of power draw) and/or duration can be determined as allowable by the management component 206. Operation of the processor circuit 202 during a turbo boost mode can therefore be regulated by the management component 206 in view of the battery stress tracking conducted by the management component 206. Additionally, operation of the system component 212 during a high power performance modes can also be regulated based on battery stress tracking by the management component 206.

Additionally, or as an alternative thereto, the management component 206 can use a history of stress or degradation to the battery 210 to determine how much additional battery degradation can be applied to tolerated. For example, the management component 206 can determine a rate of battery degradation based on stress tracking calculations such that an amount of additional or permissible stress applied to the battery 210 can be determined. The management component 206 can ensure a long term performance goal of the battery 210 can be met—e.g., a charge capacity expectation set for some time in the future. Based on a degradation rate of the battery 210 as determined by stress tracking and correlation to actual battery degradation, the management component 206 can determine if additional stress can be applied to the battery 210 while still ensuring a long term capacity goal of the battery 210 can be met. In some instance, the management component 206 may determine that the level of permissible stress is to be moderated by restricting a higher power performance mode or operation in some manner.

The management component 206 can be implemented or be part of processor circuit 202 or any other processor component of a larger system in which the system 200 operates. The management component 206 can implemented in any combination or hardware or software including, for example, any combination of firmware, power management driver software/firmware, or embedded controller (EC) code.

The system 200 can regulate operation of the processor circuit 202 in view of the stress tracking of the battery power source 210. In various embodiments, the processor circuit 202 can be permitted to operate in a burst mode—and to vary one or more of a power magnitude (e.g., peak power magnitude or power draw), duty ratio and/or operating frequency—to handle increased workloads while applying a determined acceptable level of stress to the battery power source 210. As an example, in contrast to conventional turbo boost regulation systems and methods that generally do not determine the actual stress to a battery, stress to the battery 210 can be permitted by the system 200 during high power events provided the stress remains within a predetermined acceptable amount as determined by the management component 206.

In various embodiments, the acceptable amount of stress to the battery power source 210 can depend upon a variety factors including, for example, a future acceptable battery capacity or performance level. For example, a target performance level can be an allowed degradation amount after an acceptable period of time (e.g., a desired battery capacity at some future time as set by a user) or can be a desired number of charge/discharge cycles. The management component 206 can determine if an upcoming expected or requested high power event is permissible or not or is to be adjusted (e.g., in terms of duration and/or power draw) to ensure the desired long term battery performance or stress level is maintained.

The management component 206 can track the stress to a particular battery and can adjust its operation and monitoring if a new battery is introduced to the system 200. In various embodiments, the management component 206 can store information regarding the battery power source 210 (e.g., by storing any such information in conjunction with the memory unit 204). The management component 206 can store a degradation baseline for the battery power source 210. The degradation baseline for the battery 210 can be an expected amount of stress applied to the battery 210 over the course of its lifetime. The management component 206 can also store identification information for the battery power source 210. If a new battery is introduced, the management component 206 can readjust operations in view of a change battery power supply. In various embodiments, the battery power source 210 can include firmware for tracking battery stress information (e.g., monitored stress and/or expected stress) and identification information.

Figure 3:
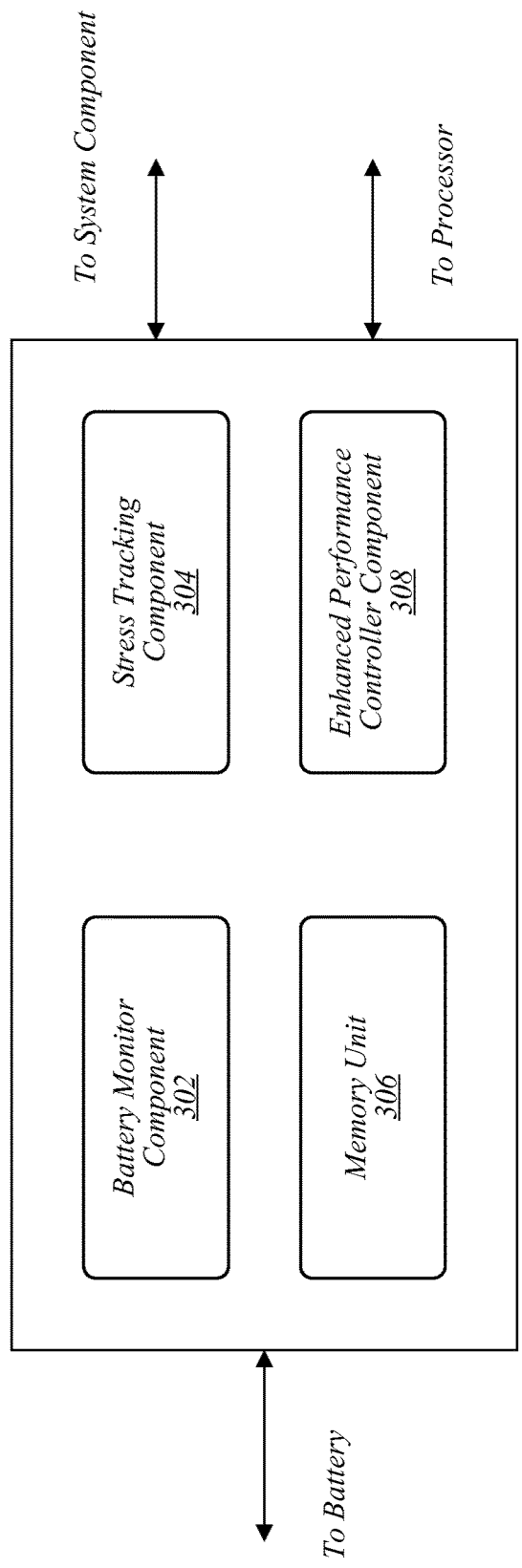
FIG. 3 illustrates a management component of the system depicted in FIG. 2.

FIG. 3 illustrates the management component 206 depicted in system 200 of FIG. 2. As shown in FIG. 3, the management component 206 can be coupled to a battery— e.g., the battery power source 210. The management component can also be coupled to a processor—e.g., the processor circuit 202. Additionally, the management component can be coupled to one or more additional system components—e.g., the system component 212. The management component 206 can include a battery monitor component 302, a stress tracking component 304, a memory unit 306, and an enhanced performance controller component 308.

The battery monitor component 302 may comprise logic, circuitry, and/or instructions (e.g., instructions capable of being executed by a processor—e.g., the processor circuit 202) for monitoring one or more characteristics of a battery (e.g., the battery power source 210). In various embodiments, the battery monitor component 302 can measure a temperature of a battery. For example, the battery monitor 302 can measure a temperature change over a predetermined expected or baseline temperature value (e.g., a temperature value of the battery that is expected or typical when the processor it powers is operating at or below a baseline operating frequency). In various embodiments, the battery monitor component 302 can measure characteristics of a battery indicative of stress being applied to the battery including, for example, temperature increases correlated to high energy discharge events, temperature increases correlated to fast charge events, ambient temperatures, and the number of charge/discharge cycles of a battery. The battery monitor component 302 can also monitor the voltage, state of charge, current, and/or charge capacity of a battery.

The stress tracking component 304 may comprise logic, circuitry, and/or instructions (e.g., instructions capable of being executed by a processor—e.g., the processor circuit 202) for tracking a level of stress experienced by a battery (e.g., the battery power source 210). The stress tracking component 304 can receive various battery characteristic data from the battery monitor 302. The stress tracking 304 can determine a stress experienced by the battery during a high power event/turbo boost event and/or a high energy discharge event based on the received battery measurement data. The stress tracking component 304 can in general track any stress applied to the battery whether the stress is applied due to a high discharge event or not. Overall, the stress tracking component 304 can determine or monitor a measure of the total or accumulated stress experienced by the battery over its lifetime as based on the events experienced by a battery through monitoring by the battery monitor component 302.

In various embodiments, the stress tracking component 304 can also calculate stress applied to a battery using a battery reliability model provided by the battery manufacturer, a degradation model developed by empirical information, or any other model (e.g., models based on the physical and chemical characteristics of the battery). Based on tracked stresses, the stress tracking component 304 can determine rate of battery degradation. The stress tracking component 304 can compare its degradation estimation to actual degradation of the battery to calibrate its estimate of battery degradation. Calibration can also be used to adjust future stress calculations to ensure they accurately reflect actual battery degradation.

The enhanced performance controller component 308 may comprise logic, circuitry, and/or instructions (e.g., instructions capable of being executed by a processor—e.g., the processor circuit 202) for determining an acceptable level of additional stress that can be applied to a battery. The enhanced performance controller 308 can determine a degradation baseline for the battery. The degradation baseline can be an expected stress level applied to the battery over its lifetime. The expected level of stress can be an estimation of stress experienced by a battery based on, for example, the lifetime of the battery and/or based on an average or baseline operating temperature of the battery. The degradation baseline can also be a reliability model for the battery. The reliability model can be directed to battery degradation/battery capacity over time as a function of observed stress. The reliability model can be based on one or more battery stress models, including stress modeling information provided by the battery manufacturer, and/or empirical or design (e.g., chemical makeup or composition) information.

The enhanced performance controller 308 can compare the accumulated stress to the battery, as determined by the stress tracking component 304, to the degradation baseline for the battery. Based on the comparison, the enhanced performance controller 308 can determine if a stress surplus or stress deficit for the battery exists. As an example, the enhanced performance controller 308 can compare the accumulated battery stress to the expected stress of the battery (i.e., the level of stress expected to be applied to the battery up to that instance in time or an average stress). If the expected stress to the battery is greater than the accumulated battery stress, then a battery stress surplus exists. In turn, it can be determined that additional stress can be applied to the battery. If the expected stress to the battery is less than the accumulated battery stress, then a battery stress deficit exists. Consequently, it can be determined that no additional stress—for example, as caused by a variable operating component operating in a higher performance mode—can be applied to the battery. The enhanced performance controller 308 can also determine a battery degradation based on the tracked stress and can compare the degradation to a degradation baseline as a battery capacity-degradation model to determine if additional battery degradation is permitted. Under either scenario, the enhanced performance controller 308 can use the observed actual stress to the battery to compare to a degradation baseline for determination if additional stress to the battery is permissible.

The enhanced performance controller 308 can regulate operation of one or more components of a computing system based on the determination of the battery stress surplus or deficit. For example, if a surplus exists, a high power performance mode of the component may be allowed to operate. If a deficit exists, a high power performance mode of the component may not be allowed to operate or may be allowed to operate with restrictions. Under either scenario, the enhanced performance controller 308 can impose restrictions on the higher power performance mode—e.g., in terms of power draw or duration. The restrictions can be based on the battery stress surplus or deficit. As an example, the enhanced performance controller 308 can determine that a turbo operation for a processor can be permitted but can regulate certain parameters of the event such as, for example, the duration and intensity of the event (e.g., peak power, duration, and/or duty cycle). In this way, the enhanced performance controller 308 can allow additional stresses to a battery to realize performance enhancing abilities of the system of which it is a part, unlike conventional management systems.

In various embodiments, the enhanced performance controller 308 can use the degradation estimation provided by the stress tracking component 304 to determine how much additional battery degradation or stress can be applied to the battery. Based on a determined rate of battery degradation as provided by the stress tracking component 304, the enhanced performance controller 308 can determine a level of additional stress that can be applied to the battery—e.g., during a higher power performance mode of operation by a system component—while still ensuring a long term battery capacity goal is met. The long term battery capacity goal can be set by a user of the system. For example, a user can set the long term goal to be a level of battery capacity available at some future point in time, as measured from when the battery is first used. If a given high power event will degrade the battery too much such that the long term capacity goal may not be met, then the enhanced performance controller 308 can determine the high power event cannot be permitted, or can be permitted with restrictions. If a given high power event will not degrade the battery too much such that the long term capacity goal may still be met, then the enhanced performance controller 308 can determine the high power event can be permitted, or can be permitted with less onerous restrictions.

In various embodiments, any constituent component of management component 206 may comprise or be arranged to communicatively couple with memory unit 306. Memory unit 306 may be implemented using any machine-readable or computer-readable media capable of storing data, including both volatile and non-volatile memory. For example, memory unit 306 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. The embodiments are not limited in this context.

The memory unit 306 can store information regarding the battery including a battery identification information, accumulated stress to the battery (e.g., actual stress experienced by the battery), and stress expected to be experienced by the battery.

Figure 4:
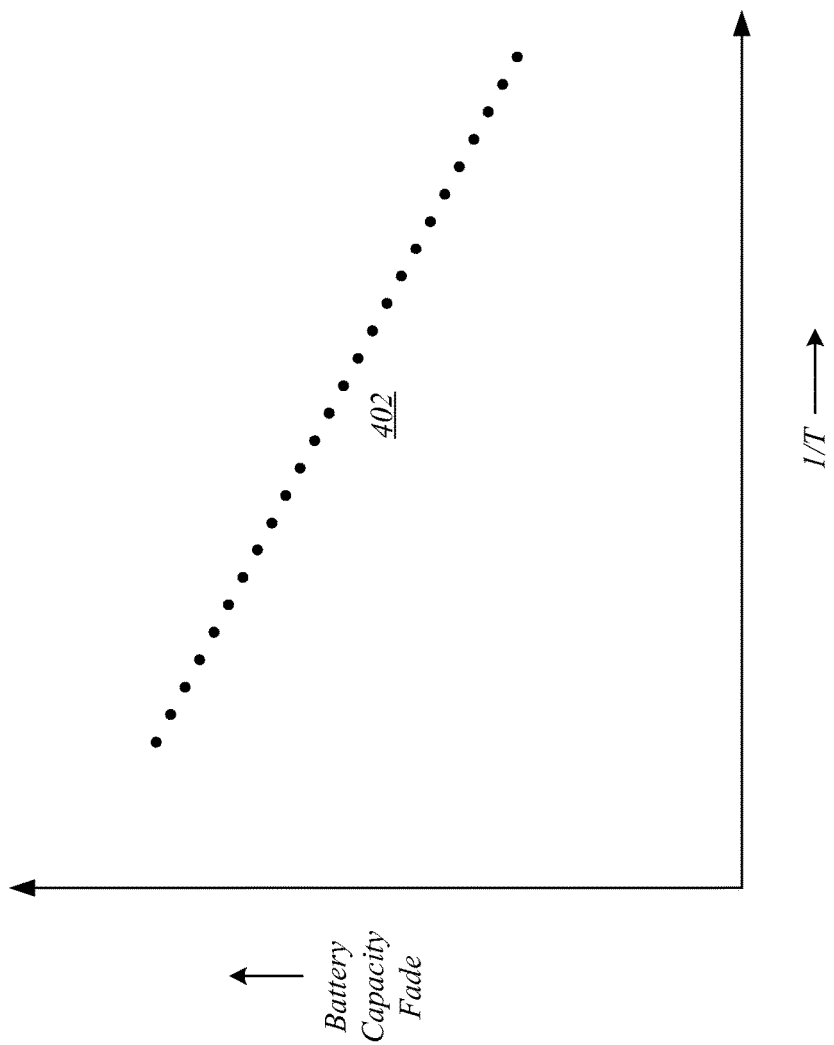
FIG. 4 illustrates a relationship between battery capacity fade and absolute temperature.

FIG. 4 illustrates an approximate relationship 400 between battery capacity fade over a specified period of time and absolute temperature (temperature indicated by "T"). In particular, FIG. 4 shows a capacity fade for a battery as compared to temperature for the battery at a specified state of charge 402. As shown, the capacity of the battery decreases over the specified period of time for increasing temperatures of the battery.

Figure 5:
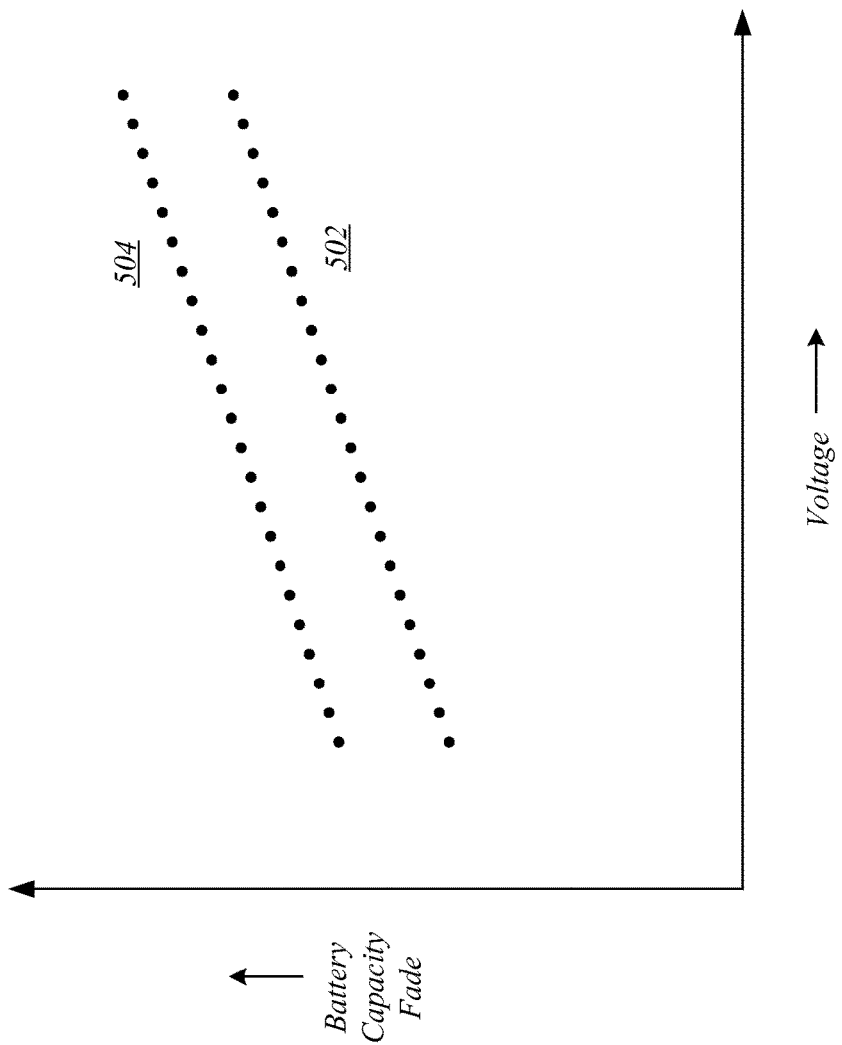
FIG. 5 illustrates a relationship between battery capacity fade and battery charge voltage.

FIG. 5 illustrates an approximate relationship 500 between battery capacity fade over a specified period of time and battery voltage. In particular, FIG. 5 shows capacity fade of a battery as compared to battery voltage for a first temperature 502 and second higher temperature 504. As shown, the capacity of the battery decreases over the specified period of time for increasing battery voltages and temperatures. The first and second temperatures 502 and 504 can be correlated to certain high energy events. As shown, for the higher temperature 504, more battery capacity fade can be expected.

FIGS. 4 and 5 are exemplary but are illustrative of the degradation to a battery due to chemical reactions that can be expressed or modeled as a function of temperature, battery voltage, and time. Accordingly, the figures illustrate that a battery's capacity, k—and therefore a possible or permissible speed of a processor—can be expressed as:

$$k = f(1/T, V, t)$$

where k is a function of absolute temperature, T, battery voltage, V, and time, t. These components can be used by the enhanced performance controller 308 to develop a reliability model for a battery as discussed above. Alternatively, or in addition thereto, the enhanced performance controller 308 can generate a degradation baseline based on an expected stress to the battery. The expected stress can be based on, for example, stress expected given expected temperatures of the battery over its lifetime.

In various embodiments, a battery-processor management module (e.g., the management component 206) can monitor absolute temperature T, battery voltage, V, and time, t, and can adjust one or more of the magnitude (e.g., peak power magnitude), duration, and duty ratio of a processor operating in a turbo boosting mode so that capacity fade/speed, k, is within or equal to a set value (e.g., 20% in 3 years). In various embodiments, if capacity-fade/speed k is lower than the set value, then turbo boosting operation of a processor can be modified to allow higher power draws and/or longer periods of operation. In this way, for short periods of time the operation of the processor can be managed to reduce the capacity of the battery to below the set level since the normalized value of battery capacity over the entire period of time will stay within or equal to the set value.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 6:
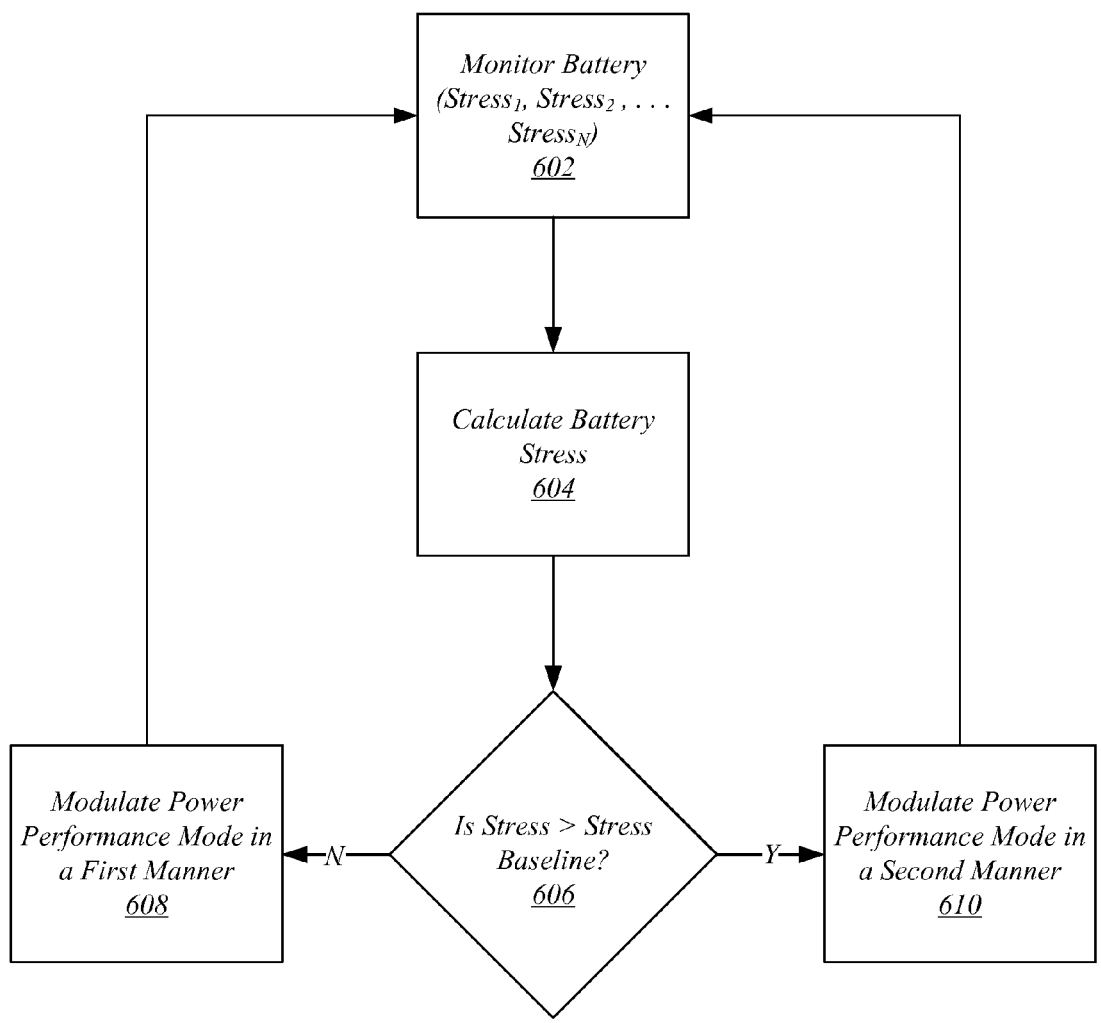
FIG. 6 illustrates an embodiment of a first logic flow.

FIG. 6 illustrates an example of a logic flow 600. Logic flow 600 may be representative of some or all of the operations executed by one or more logic, features, or devices described herein, such as those shown in FIG. 2 or 3. More particularly, logic flow 600 may be implemented by logic and/or features of a system providing a battery reliability odometer such as system 200, or any portion thereof, or management component 206 as shown in FIG. 2 or 3.

According to some examples, logic flow 600 at block 602 can monitor battery stress. Monitoring can include measuring temperature increases correlated to high energy discharge events, temperature increases correlated to fast charging events, ambient operating temperatures, and/or a number of charge/discharge cycles for a battery. In general, a characteristic of a battery can be monitored to provide stress monitoring.

As an example, the monitored stress can be stress experienced by a battery when an associated processor is operating in a boost mode or other high performance mode. The boost mode or high performance mode can include operation above a baseline operational state that can include operating at a higher than baseline operating frequency and drawing higher power than a baseline power level.

According to some examples, at block 602, battery stress can be monitored repeatedly. For example, battery stress data can be acquired or sampled over a period of time at a given set or adjustable rate. According to some examples, block 602 can be implemented by the management component 206 and/or the battery monitor 302. Information related to the stress of the battery can be collected as a sequence of collected data, e.g., as events Stress1, Stress2... StressN as shown.

According to some examples, logic flow 600 at block 604 can calculate an actual stress level experienced by a battery. The stress level experienced by the battery can be determined based on the stress monitoring information gathered at block 602. As an example, the stress level can be an accumulated or total stress experienced by the battery over the lifetime of the battery. Different levels of stress can be accumulated for different stress events. Alternatively, or in addition thereto, at block 604 the reliability impact to a battery's capacity or level of degradation can be calculated based on observed stress to the battery through monitoring at block 602.

According to some examples, block 604 can be implemented by management component 206 and/or the stress tracking component 304. According to some examples, stress to the battery can be calculated for a discrete high power event. According to some examples, stress calculations can be applied to one or more battery reliability models, e.g., models provided by the battery manufacturer, models developed by empirical information, or any other model (e.g., models based on the physical and chemical characteristics of the battery).

According to some examples, logic flow 600 at block 606 can compare any stress calculation provided at block 604 to a degradation baseline. According to some examples, the degradation baseline can be an expected stress of the battery. As such, at block 606, a total actual stress experienced by the battery can be compared to a total expected stress of the battery. In this way, a stress surplus or deficit can be determined—e.g., based on a comparison of actual stress experienced and an expected level of stress.

According to some examples, the degradation baseline can be based on a battery degradation model such that at block 606 a reliability impact to the battery degradation or capacity can be determined. In this way, a reliability surplus or deficit—related to a battery capacity or degradation—can be determined.

Overall, at block 606 a level of additional stress to a battery can be determined. Further, according to some examples, at block 606 a determination can be made if a particular high power performance event or mode of operation for a system component should be regulated. For example, if a stress surplus exist, then logic flow 600 can move to block 608. Logic flow 600 can also move to block 608 if it is determined there is a reliability surplus. If a stress deficit exists, then logic flow 600 can move to block 610. Logic flow 600 can also move to block 610 if it is determined there is a reliability deficit. In this way, logic flow 600 can base regulation of a higher power performance event on whether the event will cause stress to the battery to exceed an expected stress level or if degradation to the battery will exceed a predetermined acceptable level of degradation.

According to some examples, at block 608, a power performance mode of a computing system component is modulated or regulated in accordance with a first set of restrictions. According to some examples, at block 610, a power performance mode of a computing system component is modulated or regulated in accordance with a second set of restrictions. The second set of restrictions can be more restrictive than the first set of restrictions. As an example, at block 608, a processor can be allowed to operate in a turbo mode without any restriction. Alternatively, at block 608, the processor can be allowed to operate in a turbo mode but with some restrictions including limiting one or more of the peak power, duty cycle, or duration of the event. As a further example, at block 610, a processor can be prevented from operating in a turbo mode or can be allowed to operate in a turbo mode under a significant restriction (including limiting one or more of the peak power, duty cycle, or duration of the event).

To prevent a high power event from running without monitoring thereafter, the logic flow 600 can return to block 602 to provide ongoing monitoring. According to some examples, one or more of blocks 606, 608 and 610 can be implemented by the management component 206 and/or the enhanced performance controller component 308.

Figure 11:
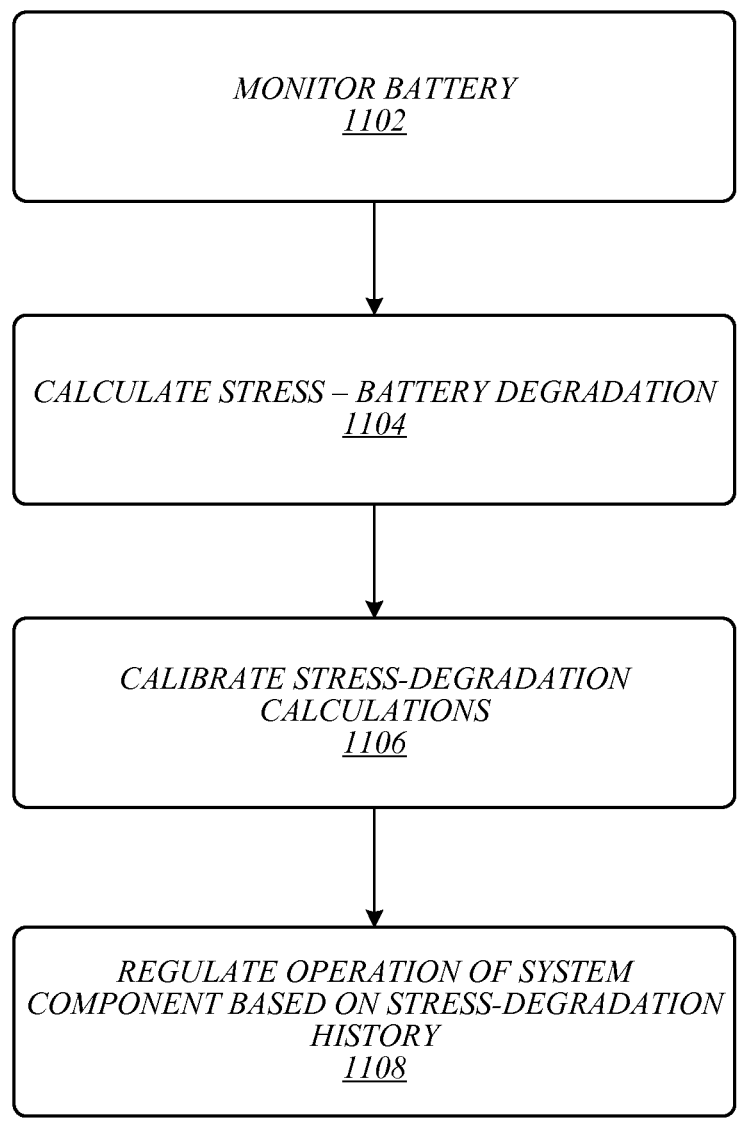
FIG. 11 illustrates an embodiment of a third logic flow.

FIG. 11 illustrates an example of a logic flow 1100. Logic flow 1100 may be representative of some or all of the operations executed by one or more logic, features, or devices described herein, such as those shown in FIG. 2 or 3. More particularly, logic flow 1100 may be implemented by logic and/or features of a system providing a battery reliability odometer such as system 200, or any portion thereof, or management component 206 as shown in FIG. 2 or 3. Logic flow 100 can be used to make decisions on how to regulate operation of a system component based on a determined battery degradation rate of a battery in view of prior stress or degradation to the battery over time such that a long term battery capacity level can be met.

According to some examples, logic flow 1100 at block 1102 can monitor a battery. One or more characteristics of the battery can be monitored including, for example, battery temperature, current, voltage, state of charge, and charge capacity.

According to some examples, logic flow 1100 at block 1104 can calculate stress experienced by the battery based on the one or more monitored battery characteristics. Battery stress can be determined as a function of one or more of the monitored battery characteristics based on a battery reliability or degradation model for the battery. The battery reliability or degradation model can be based on a battery performance or degradation model provided by the battery manufacturer, models developed by empirical information, or any other model (e.g., models based on the physical and chemical characteristics of the battery). By using the battery model information, a history of stress and therefore degradation to the battery can be estimated. Accordingly, at block 1104, a rate of battery degradation based on applied stress to the battery can be determined or calculated.

According to some examples, logic flow 1100 at block 1106 can correlate an actual rate of battery degradation to stress applied to the battery. Degradation to the battery can be monitored and tracked. For example, reduction in charge capacity over time can be determined. An estimate of the rate of battery degradation or the history of battery degradation as estimated based on stress calculations can be compared to the actual degradation of the battery over time. In this way, degradation estimates for the battery can be calibrated based on actual battery degradation over time, thereby improving the battery degradation estimate determined from stress monitoring calculations.

According to some examples, logic flow 1100 at block 1108 can regulate operation of a variable mode system component based on the determined degradation history of the battery. A determination can be made if additional applied stress to the battery will cause the estimated battery degradation rate to increase beyond an acceptable level. For example, a long term capacity goal of the battery can be set (e.g., by a user of the system). The long term capacity goal can be a desired charge capacity of the battery at some future point in time (e.g., 75% charge capacity 3 years into the life of the battery).

Based on the target capacity for the battery (e.g., a desired charge capacity at some future point in time as measured form a first use of the battery) and the battery degradation history of the battery (as based on the tracked stresses to the battery in conjunction with a battery reliability model), a battery degradation rate and rate limit can be determined. Based on the degradation rate limit (e.g., the estimation thereof), an additional amount of stress to the battery can be determined which prevents the limit from being exceeded such that the long term battery capacity goal can be met or maintained. A higher power performance mode of a variable mode component can subsequently be regulated to correspond to the additional amount of determined allowable stress that can be applied to the battery. Regulation can include limiting the power draw and/or the duration of the higher power performance mode. Regulation can also include preventing the operation of the higher power performance mode if it is determined that no additional stress can be applied.

If additional stress to the battery will cause the degradation rate of the battery to increase such that the long term goal cannot be met, then the operation of the system component can be regulated to reduce applied stress to the battery. Alternatively, if additional stress to the battery will not or is unlikely to cause the degradation rate of the battery to increase such that the long term goal cannot be met, then the operation of the system component can be regulated to allow some level of determined acceptable level of additional applied stress. Under either scenario, restrictions can be placed on the system component such as preventing a high power performance mode of operation or allowing the operation with restrictions (to limit additional stress applied to the battery). The frequency and duration of prior high stress events to the battery can be taken into account to determine if additional stress is permissible. For example, if high stress events are frequent, then less stress may be allowed compared to an amount of stress that may be tolerable if high power events are less frequent. Accordingly, block 1108 can account for the frequency and duration of high power events to determine if a battery degradation limit may be exceeded. Overall, logic flow 1100 allows an estimate of battery degradation to be used to determine an additional level of stress that can be tolerated which, in turn, translates into appropriate regulation of a high power event by a system component.

In various embodiments, stress tracking can be determined based on increases to a battery's temperature as correlated to a high energy discharge event. During such events, which may occur during a high power performance mode of operation of a computing system component, a certain level of stress—e.g., one unit—can be assigned or considered as occurring to the battery for each incremental period of time the battery temperature exceeds a baseline temperature. In this way, a running accumulation of actual stress applied to the battery can be determined. Similarly, a first level of stress can be associated with any period of time the operating temperate is within a first range above the baseline temperature and second higher level of stress can be associated with any period of time the operating temperature is within a second higher range above the baseline temperature. As such, stress tracking can account for the magnitude of the temperature increase over the baseline and can associate different amounts of stress directly to the operating temperature of the battery.

Figure 7:
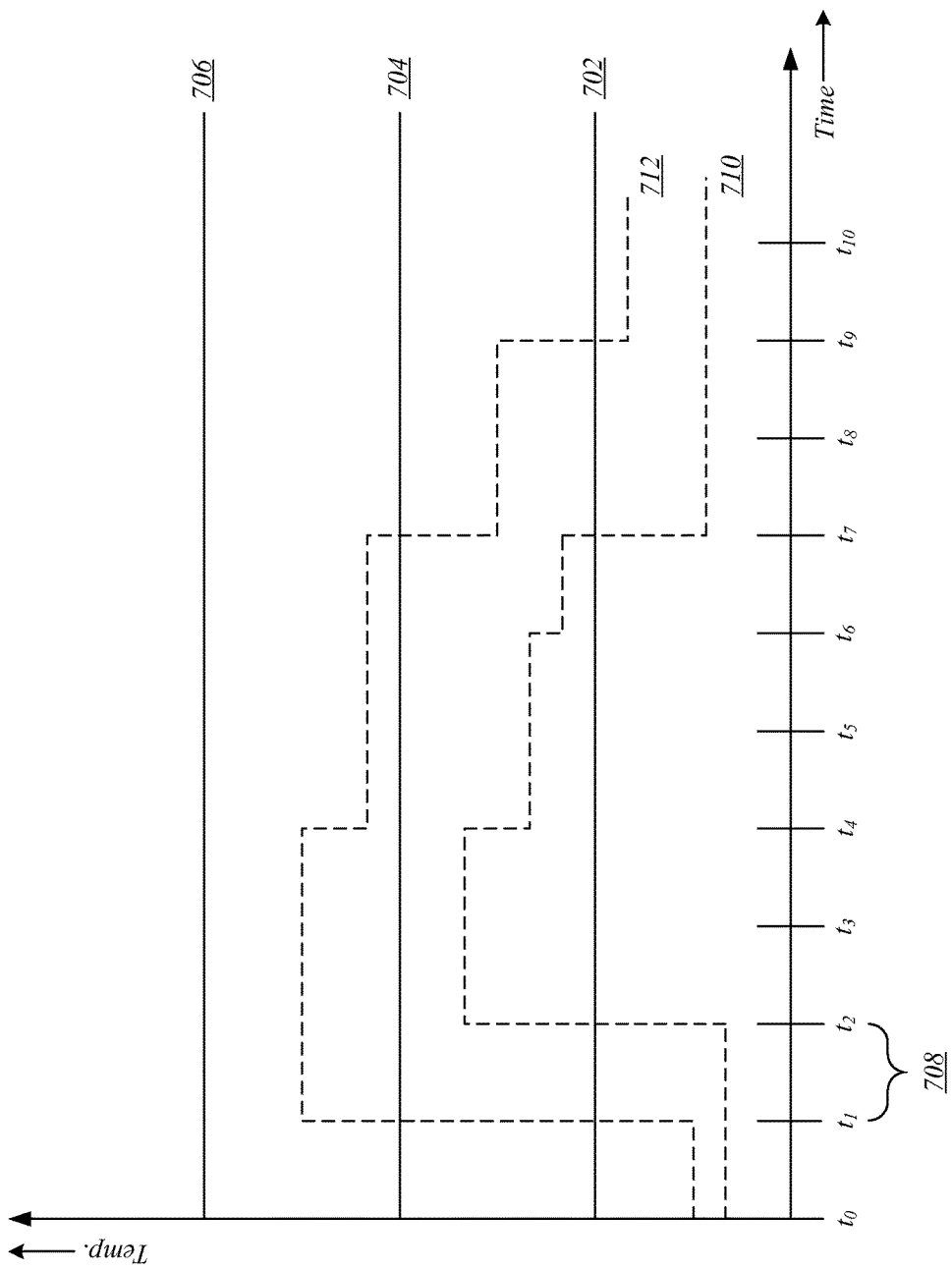
FIG. 7 illustrates an exemplary monitoring of a battery characteristic.

FIG. 7 illustrates example high energy discharge events that can be evaluated for determination of an amount of stress applied to the battery. In particular, FIG. 7 shows a relationship between the operating temperatures of a battery over time for two different high energy discharge events. A baseline operating temperature of the battery is shown by a baseline threshold 702. The baseline operating temperature of the battery can be, for example, a temperature of the battery that is generally not exceeded when a processor operates at or below a nominal or baseline operating frequency.

As the processor operates at higher and higher frequencies above a baseline clock frequency—for example, during a boost mode of operation—the temperature of the battery may increase as the power drawn from the battery may increase during such high power events. As shown in FIG. 7, battery temperature can include an indication of a first temperature threshold 704 and a second higher temperature threshold 706, both of which are higher than the baseline temperature threshold 702. Only two thresholds are shown in FIG. 7 for simplicity and the two thresholds 704 and 706 are shown as roughly evenly spaced apart, but are not so limited. Any number of thresholds or spacing between the thresholds can be established for stress tracking purposes—e.g., as based on empirical information or any battery reliability model.

The amount of time illustrated in FIG. 7 is shown to be made up of individual or incremental periods of time 708. As shown in FIG. 7, each period of time is shown to be approximately the same amount of time but is not so limited. For example, the incremental periods of time can become larger or smaller depending upon whether the operating temperature of the battery is above or below the baseline threshold 702—e.g. as determined by the management component 206 for battery stress determination purposes. For example, in various embodiments, monitoring of a battery's characteristics (e.g., temperature) may occur more frequently once the baseline threshold 702 is exceeded such that stress determinations can be correspondingly made more frequently.

As further shown in FIG. 7, a first high energy discharge event 710 and a second high energy discharge event 712 are provided as examples of how a battery's temperature may fluctuate over time in response to different high power events. For example, the first high energy discharge event 710 may represent a battery's temperature in response to a first type of high power/turbo boost event while the second high energy discharge event 712 may represent the battery's temperature in response to a second type of high power/turbo boost event.

According to various embodiments, a first amount of stress can be determined as occurring to the battery for each amount of time 708 the operating temperature of the battery exceeds the baseline threshold 702 but stays at or below the first threshold 704. A second amount of stress—higher than the first amount of stress—can be determined as occurring to the battery for each amount of time 708 the operating temperature of the battery exceeds the first threshold 704 but stays at or below the second threshold 706. By tracking the battery's operating temperature over time with the establishment of such thresholds, a measure of battery stress can be determined.

As shown in FIG. 7, the first high energy discharge event 710 and the second high energy discharge event 712 can be evaluated to determine a first total amount of stress and a second total amount of stress, respectively, experienced by the battery. Exemplary stress tracking can be shown in the following tables:

TABLE 1

For first high energy discharge event 710

| Time Period | Stress Units |
| --- | --- |
| t0-t1 | 0 |
| t1-t2 | 0 |
| t2-t3 | 1 |
| t3-t4 | 1 |
| t4-t5 | 1 |
| t5-t6 | 1 |
| t6-t7 | 1 |
| t7-t8 | 0 |
| t8-t9 | 0 |
| t9-t10 | 0 |
| Total | 5 |

TABLE 2

For second high energy discharge event 712

| Time Period | Stress Units |
| --- | --- |
| t0-t1 | 0 |
| t1-t2 | 2 |
| t2-t3 | 2 |
| t3-t4 | 2 |
| t4-t5 | 2 |
| t5-t6 | 2 |
| t6-t7 | 2 |
| t7-t8 | 1 |
| t8-t9 | 1 |
| t9-t10 | 0 |
| Total | 14 |

As can be seen in Table 1, stress to the battery due to the first high energy discharge event 710 can be less than the stress to the battery due to the second high energy discharge event 712. Both events 710 and 712 illustrate that stress tracking can provide a running tally or overall record of actual stress experienced by the battery due to high energy discharge events. The same tracking principles can be applied to all stress applied to a battery—whether or not due to high energy discharge events or baseline expected discharge events.

The exemplary stress tracking shown in FIG. 7 can be implemented by the management component 206 and/or one or more of its constituent components shown in FIG. 3. According to some embodiments, stress tracking can be made using one or more counters. For example, a counter can be incremented for each incremental stress determination (e.g., incremented once for each single unit of stress determined and incremented twice for two units of stress determined, etc.). Other techniques are within the scope of the various embodiments described herein such as, for example, maintaining separate counters for each temperature threshold demarcation (e.g., thresholds 704 and 706) or counters can operate more quickly as battery temperature over the baseline temperature 702 is further exceeded.

Figure 8:
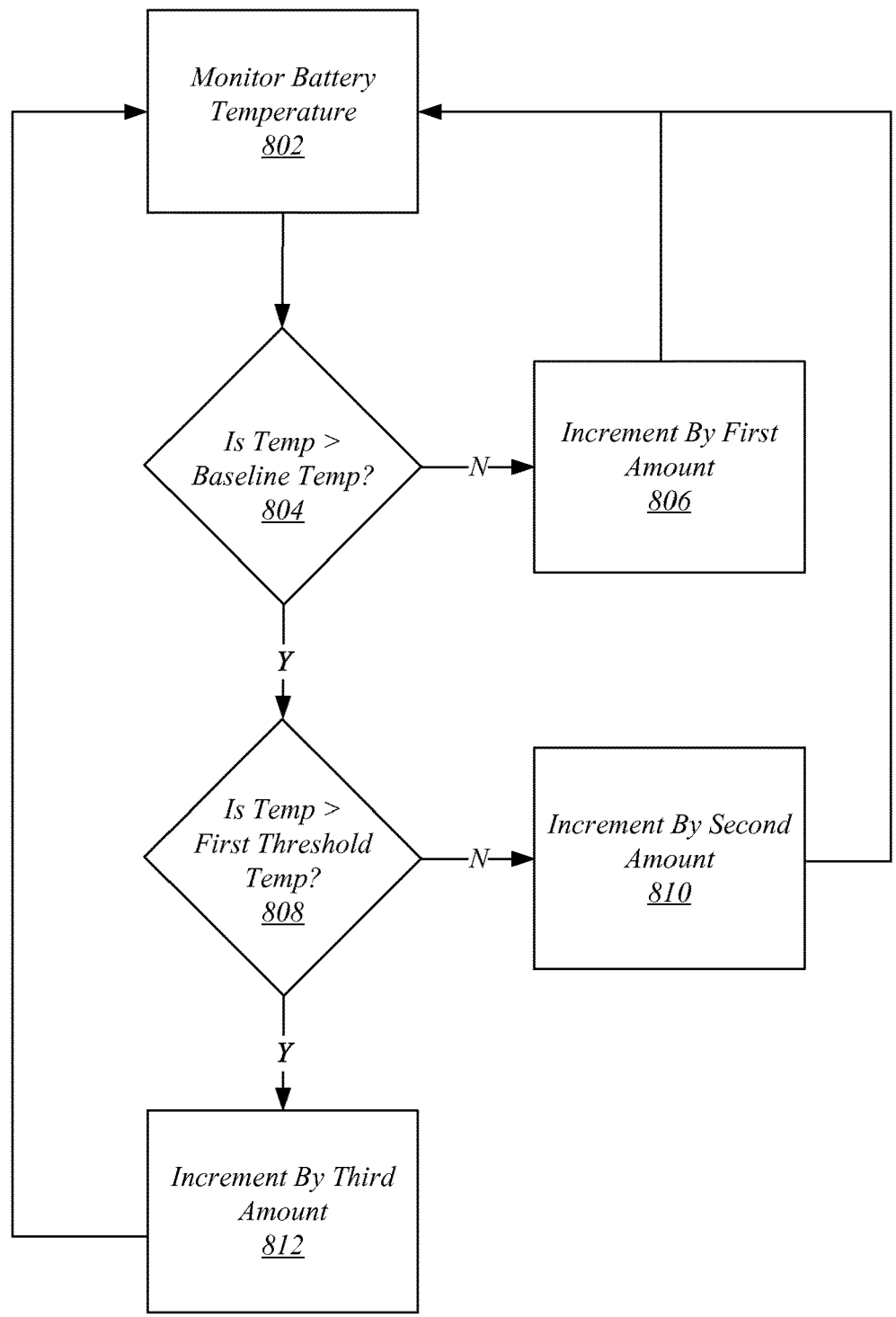
FIG. 8 illustrates an embodiment of a second logic flow.

FIG. 8 illustrates an example of a logic flow 800. Logic flow 800 may be representative of some or all of the operations executed by one or more logic, features, or devices described herein, such as shown in FIG. 2 or 3. More particularly, logic flow 800 may be implemented by logic and/or features of a system providing a battery reliability odometer such as system 200 or management component 206 as shown in FIG. 2 or 3.

According to some examples, logic flow 800 at block 802 may monitor the temperate of a battery during a high energy discharge event. The actual temperature of the battery can be monitored or a temperature value above a baseline operating temperature of the battery can be monitored. The baseline operating temperature of the battery can correspond to an associated processor operating at or below a nominal or baseline operating frequency.

According to some examples, logic flow 800 at block 804 can determine if the temperature of the battery during a high energy discharge event exceeds the baseline operating temperature. If the temperature is determined to be at or below the baseline temperature, then the logic flow can proceed to block 806. According to some examples, logic flow 800 at block 806 can determine that no stress beyond an expected level of stress to the battery is being experienced. As such, a counter or other mechanism for recording or tracking incidents of stress to the battery can be incremented by a first amount—to indicate an expected baseline of stress is experienced.

If the temperature is determined to be above the baseline temperature, then the logic flow 800 can proceed to block 808. According to some examples, logic flow 800 at block 808 can determine that stress above which is typically expected for a battery is being applied to the battery. According to some examples, at block 808 information about the temperature of the battery can be used to determine a level of stress being applied to the battery. For example, at block 808, it can be determined whether the battery temperature exceeds a first predetermined threshold. If the temperature is determined to exceed the first threshold, then the logic flow 800 can proceed to block 812. If the temperature is determined to not exceed the first threshold, then the logic flow 800 can proceed to block 810.

The first threshold can correspond to a first amount of stress being applied to the battery for a specified period of time, over some expected stress. That is, when the battery temperature is above the baseline threshold and at or below the first threshold, then a first amount of stress over an expected amount can be considered to be applied to the battery. Further, when the battery temperature is above the first threshold, then a second amount of stress greater than the first amount of stress can be considered to be applied to the battery. In this way, logic flow 800 can determine a particular level of stress corresponding to temperatures above or below a first threshold for a specific high energy discharge event. As will be appreciated by one skilled in the relevant arts, logic flow 800 can accommodate additional thresholds and corresponding levels of stress determined to be applied as a result.

According to some examples, the logic flow 800 at block 810 can determine that the second amount of stress is being applied to the battery. As such, a counter can be incremented in a manner corresponding to the second amount of stress. As an example, the counter can be incremented by two values. According to some examples, the logic flow 800 at block 812 can determine that the third amount of stress is being applied to the battery. As such, the counter can be incremented in a manner corresponding to the third amount of stress. As an example, the counter can be incremented by three values.

According to some examples, logic flow 800 can be performed repeatedly for each incremental period of time. That is, logic flow 800 can calculate stress for a specified period of time as a processor operates below or above any nominal frequency. As such, for any high power event, the logic flow 800 can generate a running tally or assessment of the amount of stress in an incremental manner over the duration of any period of time for a given high energy discharge event. Accordingly, each of blocks 806, 810 and 812 are shown as retuning to block 802 for another evaluation of the amount of stress applied to the battery. Overall, logic flow 800 can provide a manner for increasing calculated stress for corresponding or proportional increases in battery temperature. Logic flow 800 is applicable to other high power performance modes—e.g., logic flow 800 can be used to track stress to a battery from a computing system component operating in a high energy performance mode that may cause increases in battery operating temperature.

FIG. 9 illustrates an example storage medium 900. As shown in FIG. 9, the first storage medium includes a storage medium 900. The storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions to implement logic flow 600, logic flow 800, or logic flow 1100. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
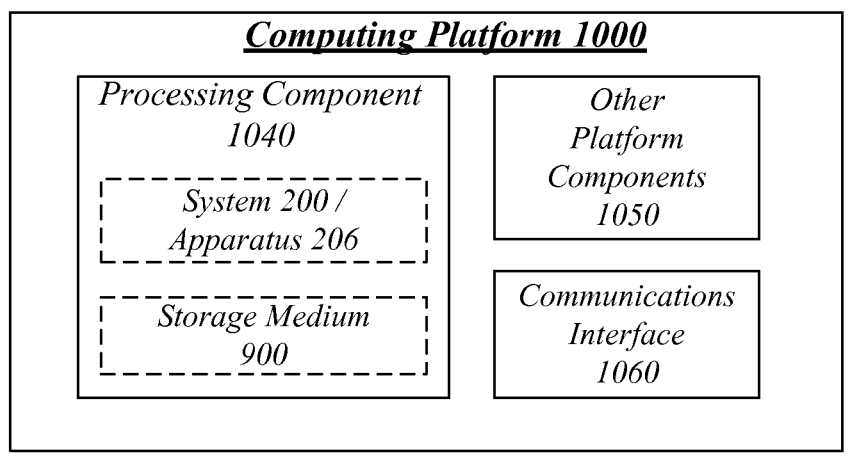
FIG. 10 illustrates an example computing platform.

FIG. 10 illustrates an example computing platform 1000. In some examples, as shown in FIG. 10, computing platform 1000 may include a processing component 1040, other platform components 1050 or a communications interface 1060. According to some examples, computing platform 1000 may host power and/or performance management elements (e.g., system 200 or any constituent component thereof or apparatus 206) providing power/performance management functionality for a device having a turbo enabled processor.

According to some examples, processing component 1040 may execute processing operations or logic for any portion of system 200 and/or storage medium 900. Processing component 1040 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1050 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1060 may include logic and/or features to support a communication interface. For these examples, communications interface 1060 may include one or more communication interfaces that operate according to various communication protocols or standards to communicate over direct or network communication links. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Hardware Abstraction API Specification. Network communications may also occur according to the Infiniband Architecture specification or the TCP/IP protocol.

In general, communications interface can provide computing platform 1000 with the ability to communication over one or more of a variety of known wireless or wired communication links.

The computing platform 1000 may be implemented in a single network device or a logical network device made up of composed disaggregate physical components or elements from a shared pool of configurable computing resources. Accordingly, functions and/or specific configurations of computing platform 1000 described herein, may be included or omitted in various embodiments of computing platform 1000, as suitably desired for a physical or logical network device. Further, the computing platform 1000 can be a portion of a larger device—e.g., any computing device such as a handheld device that may rely on a battery power supply and include a processor capable of enhanced performance/turbo boosting. For example, the computing platform 1000 can be a portion of a desktop or laptop computer, tablet, smartphone, or camera.

The components and features of computing platform 1000 may be implemented using any combination of discrete circuitry, application specific integrated circuits (ASICs), logic gates and/or single chip architectures. Further, the features of computing platform 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their revisions, progeny and variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/

High Speed Packet Access (HSPA), and/or GSM with General Packet Radio Service (GPRS) system (GSM/GPRS) technologies and/or standards, including their revisions, progeny and variants. Further, the techniques disclosed herein may involve transmission of data within licensed frequency bands or spectrum or within unlicensed frequency bands or spectrum. Examples of communications over unlicensed frequency spectrum using unlicensed carriers include 3GPP License-Assisted Access (LAA) and LTE-Unlicensed (LTE-U).

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1xRTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA), High Speed Packet Access (HSPA) technologies and/or standards, including their revisions, progeny and variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency Wireless Local Area Network (WLAN) (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

The following set of examples pertain to further embodiments:

Example 1 is an apparatus comprising a variable mode component with multiple operational modes, at least one of which is a higher power performance mode, and logic, at least a portion of which is implemented in hardware, the logic comprising a battery monitor component to monitor a characteristic of a battery arranged to provide power to the variable mode component, a stress tracking component to determine an accumulated amount of stress to the battery based on the battery characteristic, and a controller component to compare the determined accumulated amount of stress to the battery with an expected amount of stress to the battery, and to regulate operation of the variable mode component in the higher power performance mode based on the comparison. Example 2 is an extension of Example 1, the result to comprise a stress surplus when the determined accumulated amount of stress is less than the expected amount of stress. Example 3 is an extension of Example 1, the result to comprise a stress deficit when the determined accumulated amount of stress is greater than the expected amount of stress. Example 4 is an extension of Example 1, the variable mode component to comprise a processor. Example 5 is an extension of Example 4, the higher power performance mode to comprise an overclocking mode of the processor. Example 6 is an extension of Example 1, the variable mode component to comprise a camera. Example 7 is an extension of Example 6, the higher power performance mode to comprise a resolution mode of the camera. Example 8 is an extension of Example 6, the higher power performance mode to comprise a flash mode of the camera. Example 9 is an extension of Example 1, the variable mode component to comprise a display. Example 10 is an extension of Example 9, the higher power performance mode to comprise a light intensity mode of the display. Example 11 is an extension of Example 1, the higher power performance mode to demand more power from the battery than a baseline performance mode of the variable mode component. Example 12 is an extension of Example 1, the controller to regulate operation of the variable mode component in the higher power performance mode based on a first restriction when the determined accumulated amount of stress is greater than the expected amount of stress and to regulate the variable mode component in the higher power performance mode based on a second restriction when the determined accumulated amount of stress is less than the expected amount of stress. Example 13 is an extension of Example 12, the first restriction to comprise prevention of the variable mode component from operation in the higher power performance mode. Example 14 is an extension of Example 12, the first restriction to comprise adjustment of one of a power draw and a duration of the higher power performance mode. Example 15 is an extension of Example 12, the second restriction to comprise adjustment of one of a power draw and a duration of the higher power performance mode. Example 16 is an extension of Example 1, the battery characteristic to comprise one of a battery temperature increase correlated to a high energy discharge event, a battery temperature increase correlated to a fast charge event, an ambient temperature increase, and a number of charging-discharging cycles of the battery. Example 17 is an extension of Example 16, the high energy discharge event to correspond to the higher power performance mode of the variable mode component. Example 18 is an extension of Example 1, the expected amount of stress to the battery to comprise an average amount of stress applied to the battery. Example 19 is a system comprising an apparatus according to any of Examples 1 to 18 and a user interface.

Example 20 is a method comprising monitoring a characteristic of a battery, tracking an accumulated amount of stress to the battery based on the battery characteristic, comparing the accumulated amount of stress with an expected amount of stress to the battery, and regulating operation of a higher power performance mode of a variable mode component powered by the battery based on a result of the comparison. Example 21 is an extension of Example 20, the result to comprise a stress surplus when the accumulated amount of stress is less than the expected amount of stress. Example 22 is an extension of Example 20, the result to comprise a stress deficit when the accumulated amount of stress is greater than the expected amount of stress. Example 23 is an extension of Example 20, the variable mode component to comprise a processor. Example 24 is an extension of Example 23, the higher power performance mode to comprise an overclocking mode of the processor. Example 25 is an extension of Example 20, the variable mode component to comprise a camera. Example 26 is an extension of Example 25, the higher power performance mode to comprise a resolution mode of the camera. Example 27 is an extension of Example 25, the higher power performance mode to comprise a flash mode of the camera. Example 28 is an extension of Example 20, the variable mode component to comprise a display. Example 29 is an extension of Example 28, the higher power performance mode to comprise a light intensity mode of the display. Example 30 is an extension of Example 20, the higher power performance mode to demand more power from the battery than a baseline performance mode of the variable mode component. Example 31 is an extension of Example 20, the regulating to comprise operating under a first restriction when the accumulated amount of stress is greater than the expected amount of stress and to comprise operating under a second restriction when the accumulated amount of stress is less than the expected amount of stress. Example 32 is an extension of Example 31, the operating under the first restriction to comprise preventing the variable mode component from operating in the higher power performance mode. Example 33 is an extension of Example 31, the operating under the first restriction to comprise adjusting one of a power draw and a duration of the higher power performance mode. Example 34 is an extension of Example 31, the operating under the second restriction to comprise adjusting one of a power draw and a duration of the higher power performance mode. Example 35 is an extension of Example 20, the monitoring to comprise measuring one of a battery temperature increase correlated to a high energy discharge event, a battery temperature increase correlated to a fast charge event, an ambient temperature increase, and a number of charging-discharging cycles of the battery. Example 36 is an extension of Example 35, the high energy discharge event to correspond to the higher power performance mode of the variable mode component. Example 37 is an extension of Example 20, comprising determining the expected amount of stress to the battery to comprise an average amount of stress applied to the battery. Example 38 is at least one non-transitory computer-readable storage medium comprising a set of instructions that, in response to being executed on a computing device, cause the computing device to perform a method according to any of Examples 20 to 37. Example 39 is an apparatus, comprising means for performing a method according to any of Examples 20 to 37.

Example 40 is at least one non-transitory computer-readable storage medium comprising a set of instructions that, in response to being executed at computing device, cause the computing device to monitor a characteristic of a battery, track an accumulated amount of stress to the battery based on the battery characteristic, compare the accumulated amount of stress to an expected amount of stress to the battery, and regulate operation of a higher power performance mode of a variable mode component powered by the battery based on a result of the comparison. Example 41 is an extension of Example 40, comprising instructions that, in response to being executed at the computing device, cause the computing device to regulate an overclocking mode of a processor. Example 42 is an extension of Example 40, comprising instructions that, in response to being executed at the computing device, cause the computing device to regulate a resolution mode of a camera. Example 43 is an extension of Example 40, comprising instructions that, in response to being executed at the computing device, cause the computing device to regulate a flash mode of a camera. Example 44 is an extension of Example 40, comprising instructions that, in response to being executed at the computing device, cause the computing device to regulate a light intensity mode of a display. Example 45 is an extension of Example 40, comprising instructions that, in response to being executed at the computing device, cause the computing device to regulate the higher power performance mode under a first restriction when the accumulated amount of stress is greater than the expected amount of stress and to regulate the higher power performance mode under a second restriction when the accumulated amount of stress is less than the expected amount of stress. Example 46 is an extension of Example 45, comprising instructions that, in response to being executed at the computing device, cause the computing device to generate the first restriction to comprise prevention of the variable mode component from operating in the higher power performance mode. Example 47 is an extension of Example 45, comprising instructions that, in response to being executed at the computing device, cause the computing device to generate the first restriction to comprise adjusting one of a power draw and a duration of the higher power performance mode. Example 48 is an extension of Example 45, comprising instructions that, in response to being executed at the computing device, cause the computing device to generate the second restriction to comprise adjusting one of a power draw and a duration of the higher power performance mode. Example 49 is an extension of Example 40, comprising instructions that, in response to being executed at the computing device, cause the computing device to monitor one of a battery temperature increase correlated to a high energy discharge event, a battery temperature increase correlated to a fast charge event, an ambient temperature increase, and a number of charging-discharging cycles of the battery. Example 50 is an extension of Example 40, comprising instructions that, in response to being executed at the computing device, cause the computing device to generate the expected amount of stress to the battery based on an average amount of stress applied to the battery.

Example 51 is an apparatus, comprising a variable mode component with multiple operational modes, at least one of which is a higher power performance mode and logic, at least a portion of which is implemented in hardware, the logic comprising a battery monitor component to monitor a characteristic of a battery arranged to provide power to the variable mode component, a stress tracking component to determine an amount of battery degradation based on the battery characteristic, and a controller component to regulate operation of the variable mode component in the higher power performance mode based on a comparison of the amount of battery degradation with a battery degradation baseline. Example 52 is an extension of Example 51, the variable mode component to comprise a processor. Example 53 is an extension of Example 52, the higher power performance mode to comprise an overclocking mode of the processor. Example 54 is an extension of Example 51, the variable mode component to comprise a camera. Example 55 is an extension of Example 54, the higher power performance mode to comprise a resolution mode of the camera. Example 56 is an extension of Example 54, the higher power performance mode to comprise a flash mode of the camera. Example 57 is an extension of Example 51, the variable mode component to comprise a display. Example 58 is an extension of Example 57, the higher power performance mode to comprise a light intensity mode of the display. Example 59 is an extension of Example 51, the higher power performance mode to demand more power from the battery than a baseline performance mode of the variable mode component. Example 60 is an extension of Example 51, the controller to regulate operation of the variable mode component in the higher power performance mode based on a first restriction when the amount of battery degradation is determined to be acceptable. Example 61 is an extension of Example 60, the first restriction to comprise prevention of the variable mode component from operation in the higher power performance mode. Example 62 is an extension of Example 60, the first restriction to comprise adjustment of one of a power draw and a duration of the higher power performance mode. Example 63 is an extension of Example 60, the controller to regulate operation of the variable mode component in the higher power performance mode based on a second restriction when the amount of battery degradation is determined to be unacceptable. Example 64 is an extension of Example 63, the second restriction to comprise adjustment of one of a power draw and a duration of the higher power performance mode. Example 65 is an extension of Example 51, the battery characteristic to comprise one of a battery temperature increase correlated to a high energy discharge event, a battery temperature increase correlated to a fast charge event, an ambient temperature increase, and a number of charging-discharging cycles of the battery. Example 66 is an extension of Example 65, the high energy discharge event to correspond to the higher power performance mode of the variable mode component. Example 67 is an extension of Example 51, the battery degradation baseline to be based on a model of a capacity of the battery. Example 68 is a system comprising an apparatus according to any of Examples 51 to 67 and a user interface.

Example 69 is a method comprising monitoring a characteristic of a battery, determining an amount of battery degradation based on the battery characteristic, and regulating operation of a higher power performance mode of a variable mode component powered by the battery based on a comparison of the amount of battery degradation to a battery degradation baseline. Example 70 is an extension of Example 69, the regulating to comprise operating under a first restriction when the amount of battery degradation is determined to be acceptable. Example 71 is an extension of Example 70, the operating under the first restriction to comprise preventing the variable mode component from operating in the higher power performance mode. Example 72 is an extension of Example 70, the operating under the first restriction to comprise adjusting one of a power draw and a duration of the higher power performance mode. Example 73 is an extension of Example 70, the regulating to comprise operating under a second restriction when the amount of battery degradation is determined to be unacceptable. Example 74 is an extension of Example 73, the operating under the second restriction to comprise adjusting one of a power draw and a duration of the higher power performance mode. Example 75 is an extension of Example 69, the monitoring to comprise measuring one of a battery temperature increase correlated to a high energy discharge event, a battery temperature increase correlated to a fast charge event, an ambient temperature increase, and a number of charging-discharging cycles of the battery. Example 76 is an extension of Example 69, comprising generating the battery degradation baseline based on a model of a capacity of the battery. Example 77 is at least one non-transitory computer-readable storage medium comprising a set of instructions that, in response to being executed on a computing device, cause the computing device to perform a method according to any of Examples 69 to 76. Example 78 is an apparatus, comprising means for performing a method according to any of Examples 69 to 76.

Example 79 is an apparatus comprising a variable mode component with multiple operational modes, at least one of which is a higher power performance mode, a battery to power the variable mode component, and logic, at least a portion of which is implemented in hardware, the logic comprising a battery monitor component to measure a characteristic of the battery, a stress calculator component to determine a degradation history of the battery based on the measured characteristic of the battery, and a controller component to determine an amount of additional stress to apply to the battery based on the degradation history of the battery and to regulate operation of the higher power performance mode of the variable mode component to maintain a target capacity of the battery. Example 80 is an extension of Example 79, the battery monitor component to measure at least one of a voltage, a current, a state of charge, a temperature, and a charging capacity of the battery. Example 81 is an extension of Example 79, the stress calculator component to determine the degradation history of the battery based on a battery reliability model. Example 82 is an extension of Example 81, the battery reliability model to be based on at least one of a battery degradation model provided by a manufacturer, empirical data, and physical and chemical characteristics of the battery. Example 83 is an extension of Example 79, the controller component to determine a battery degradation rate limit based on the degradation history of the battery and the target capacity of the battery. Example 84 is an extension of Example 83, the target charge capacity of the battery to comprise a desired battery charging capacity corresponding to a desired point in time as measured from a first use of the battery. Example 85 is an extension of Example 83, the controller component to determine the additional amount of stress to apply to the battery such that the battery degradation rate limit is not exceeded. Example 86 is an extension of Example 79, the stress calculator component to calibrate the degradation history of the battery to an actual degradation of the battery. Example 87 is an extension of Example 79, the logic to adjust one of a power draw and a duration of the higher power performance mode of the variable mode component to correspond to the determined amount of additional stress to apply to the battery. Example 88 is a system comprising an apparatus according to any of Examples 79 to 87, a user interface, and a display.

Example 89 is a method comprising measuring a characteristic of a battery powering a variable mode component with multiple operational modes, at least one of which is a higher power performance mode, determining a degradation history of the battery based on the measured characteristic of the battery, determining an additional amount of stress to apply to the battery based on the determined degradation history of the battery, and regulating the higher power performance mode of the variable mode component to maintain a target capacity of the battery. Example 90 is an extension of Example 89, comprising measuring at least one of a voltage, a current, a state of charge, a temperature, and a charging capacity of the battery. Example 91 is an extension of Example 89, determining the degradation history of the battery based on a battery reliability model. Example 92 is an extension of Example 89, comprising determining a battery degradation rate limit based on the degradation history of the battery and the target capacity of the battery. Example 93 is an extension of Example 92, determining the additional amount of stress to apply to the battery such that the battery degradation rate limit is not exceeded. Example 94 is an extension of Example 89, comprising calibrating the degradation history of the battery to an actual degradation of the battery. Example 95 is an extension of Example 89, regulating to comprise adjusting one of a power draw and a duration of the higher power performance mode of the variable mode component to correspond to the determined amount of additional stress to apply to the battery. Example 96 is at least one non-transitory computer-readable storage medium comprising a set of instructions that, in response to being executed on a computing device, cause the computing device to perform a method according to any of Examples 89 to 95. Example 97 is an apparatus, comprising means for performing a method according to any of Examples 89 to 95.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a variable mode component with multiple operational modes, at least one of which is a higher power performance mode;
a processor coupled to the variable mode component and a battery, the battery arranged to provide power to the variable mode component; and
memory coupled to the processor, the memory comprising instructions that when executed by the processor cause the processor to:
monitor a temperature of the battery;
determine an accumulated amount of stress to the battery by periodically incrementing a counter based on the temperature of the battery, the accumulated amount of stress to the battery associated with degradation of the battery and wherein the counter is incremented by a first amount for each period of time when the temperature of the battery is between a baseline temperature and a first threshold temperature and the counter is incremented by a second amount for each period of time when the temperature of the battery is between the first threshold temperature and a second threshold temperature; and
determine an expected amount of stress to the battery based on a predefined target battery capacity at a future point in time; and
compare the determined accumulated amount of stress to the battery with the expected amount of stress to the battery;
determine a stress surplus/deficit of the battery based on the comparison; and
regulate operation of the variable mode component in the higher power performance mode based on the stress surplus/deficit of the battery.

2. The apparatus of claim 1, the variable mode component to comprise a processor.

3. The apparatus of claim 2, the higher power performance mode to comprise an overclocking mode of the processor.

4. The apparatus of claim 1, the variable mode component to comprise a camera.

5. The apparatus of claim 4, the higher power performance mode to comprise a resolution mode of the camera.

6. The apparatus of claim 4, the higher power performance mode to comprise a flash mode of the camera.

7. The apparatus of claim 1, the variable mode component to comprise a display.

8. The apparatus of claim 7, the higher power performance mode to comprise a light intensity mode of the display.

9. The apparatus of claim 1, the higher power performance mode to demand more power from the battery than a baseline performance mode of the variable mode component.

10. The apparatus of claim 1, the instructions, when executed by the processor cause the processor to regulate the higher power performance mode based on a first restriction when a stress deficit is determined based on the determined accumulated amount of stress being greater than the expected amount of stress and to regulate the higher power performance mode based on a second restriction when a stress surplus is determined based on the determined accumulated amount of stress being less than the expected amount of stress.

11. The apparatus of claim 10, the first restriction to comprise prevention of the variable mode component from operation in the higher power performance mode.

12. The apparatus of claim 10, the second restriction to comprise adjustment of one of a power draw and a duration of the higher power performance mode.

13. The apparatus of claim 1, the expected amount of stress to the battery to comprise an average amount of stress applied to the battery.

14. At least one non-transitory computer-readable storage medium comprising a set of instructions that, in response to being executed at a computing device, cause the computing device to:
monitor a temperature of a battery;
track an accumulated amount of stress to the battery by periodically incrementing a counter based on the temperature of the battery, the accumulated amount of stress to the battery associated with degradation of the battery and wherein the counter is incremented by a first amount for each period of time when the temperature of the battery is between a baseline temperature and a first threshold temperature and the counter is incremented by a second amount for each period of time when the temperature of the battery is between the first threshold temperature and a second threshold temperature;
determine an expected amount of stress to the battery based on a predefined target battery capacity at a future point in time;
compare the accumulated amount of stress to the battery with the expected amount of stress to the battery;
determine a stress surplus/deficit of the battery based on the comparison; and
regulate operation of a higher power performance mode of a variable mode component powered by the battery based on the stress surplus/deficit of the battery.

15. The at least one non-transitory computer-readable storage medium of claim 14, comprising instructions that, in response to being executed at the computing device, cause the computing device to regulate an overclocking mode of a processor.

16. The at least one non-transitory computer-readable storage medium of claim 14, comprising instructions that, in response to being executed at the computing device, cause the computing device to regulate one of a resolution mode and a flash mode of a camera.

17. The at least one non-transitory computer-readable storage medium of claim 14, comprising instructions that, in response to being executed at the computing device, cause the computing device to regulate a light intensity mode of a display.

18. The at least one non-transitory computer-readable storage medium of claim 14, comprising instructions that, in response to being executed at the computing device, cause the computing device to regulate the higher power performance mode under a first restriction when a stress deficit is determined based on the accumulated amount of stress being greater than the expected amount of stress and to regulate the higher power performance mode under a second restriction when a stress surplus is determined based on the accumulated amount of stress being less than the expected amount of stress.

19. The at least one non-transitory computer-readable storage medium of claim 18, comprising instructions that, in response to being executed at the computing device, cause the computing device to generate the first restriction to comprise prevention of the variable mode component from operating in the higher power performance mode.

20. The at least one non-transitory computer-readable storage medium of claim 18, comprising instructions that, in response to being executed at the computing device, cause the computing device to generate the second restriction to comprise adjusting one of a power draw and a duration of the higher power performance mode.

21. The at least one non-transitory computer-readable storage medium of claim 14, comprising instructions that, in response to being executed at the computing device, cause the computing device to monitor one of a battery temperature increase correlated to a high energy discharge event, a battery temperature increase correlated to a fast charge event, an ambient temperature increase, and a number of charging-discharging cycles of the battery.

22. A method, comprising:
monitoring a temperature of a battery;
tracking an accumulated amount of stress to the battery by periodically incrementing a counter based on the temperature of the battery, the accumulated amount of stress to the battery associated with degradation of the battery and wherein the counter is incremented by a first amount for each period of time when the temperature of the battery is between a baseline temperature and a first threshold temperature and the counter is incremented by a second amount for each period of time when the temperature of the battery is between the first threshold temperature and a second threshold temperature;
determining an expected amount of stress to the battery based on a predefined target battery capacity at a future point in time;
comparing the accumulated amount of stress to the battery with the expected amount of stress to the battery;
determining a stress surplus/deficit of the batter based on the comparison; and
regulating operation of a higher power performance mode of a variable mode component powered by the battery based on the stress surplus/deficit of the battery.

23. The method of claim 22, the regulating to comprise operating under a first restriction when a stress deficit is determined based on the accumulated amount of stress being greater than the expected amount of stress and to comprise operating under a second restriction when a stress surplus is determined based on the accumulated amount of stress being less than the expected amount of stress.

* * * * *